March 6, 1973 D. L. HARDING ET AL 3,719,222
FRAMED SCREEN PANEL
Filed May 4, 1971 2 Sheets-Sheet 1
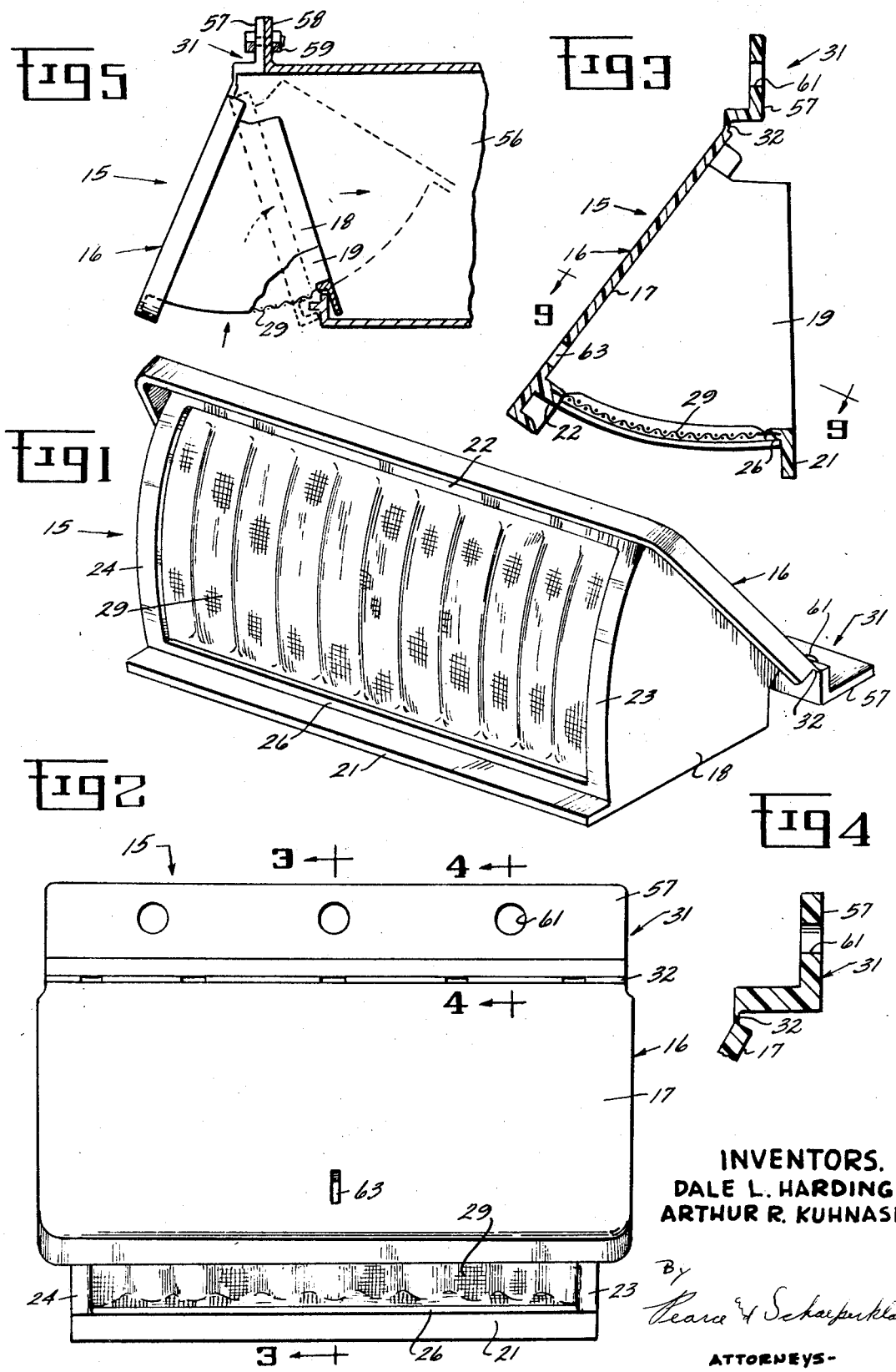
INVENTORS.
DALE L. HARDING
ARTHUR R. KUHNASH
By Pearce & Scherperklaus
ATTORNEYS March 6, 1973  D. L. HARDING ET AL  3,719,222
FRAMED SCREEN PANEL
Filed May 4, 1971  2 Sheets-Sheet 2
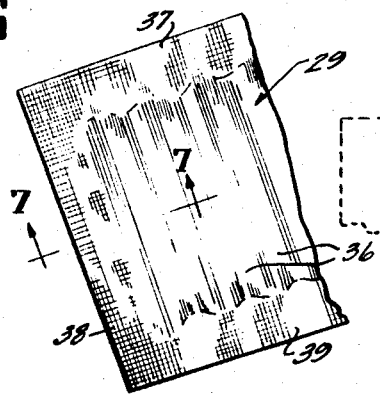
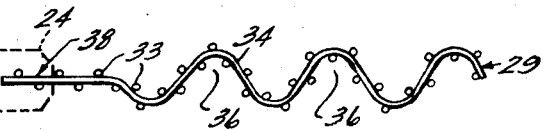
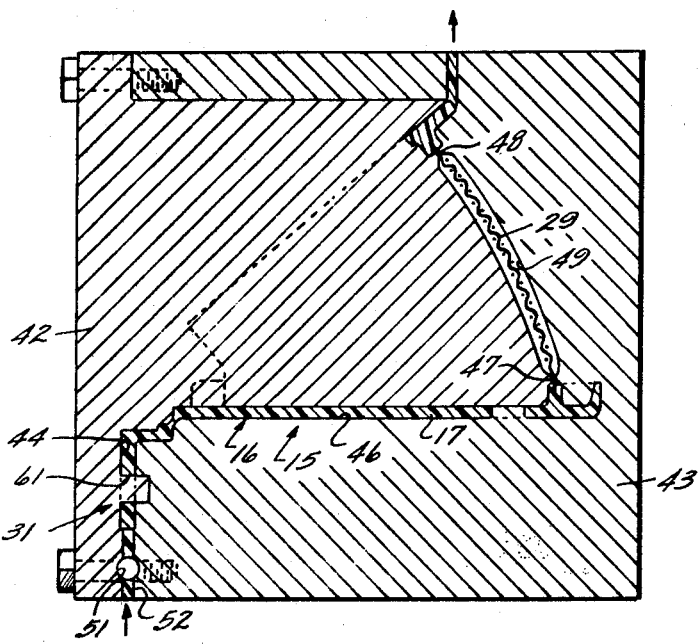
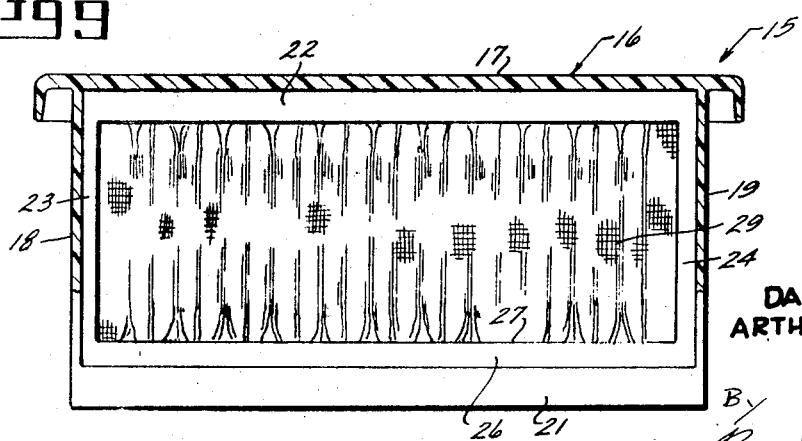
INVENTORS.
DALE L. HARDING
ARTHUR R. KUHNASH
By Pearce & Schaeperklaus
ATTORNEYS

United States Patent Office 3,719,222
Patented Mar. 6, 1973

3,719,222
FRAMED SCREEN PANEL
Dale L. Harding and Arthur R. Kuhnash, Cambridge, Ohio, assignors to Textron, Inc., Providence, R.I.
Filed May 4, 1971, Ser. No. 140,026
Int. Cl. E06b *9/00*
U.S. Cl. 160—371                                         2 Claims

ABSTRACT OF THE DISCLOSURE

A framed screen panel having a plurality of side-by-side corrugations in a central portion which terminate adjacent marginal edges of the screen panel. A plastic frame is molded on the marginal edges of the screen panel.

---

This invention relates to screens and to screen frames. More particularly, this invention relates to a screen construction in which the frame and screen cloth are of different materials.

When the screen frame and the screen cloth are of different materials, differences in rates of expansion and contraction on heating and cooling can cause warping. In addition, when the screen cloth is metal, any deforming of the metal during molding can build up strains in the metal resulting in stresses in the frame which also cause warping. An object of this invention is to provide a framed screen structure in which the screen is provided with a corrugated pattern which relieves such strains and in which such warping is minimized or eliminated.

Briefly, this invention provides a framed screen in which a screen panel thereof is formed with transversely extending corrugations which can accommodate the stresses caused by molding and temperature changes. The corrugations terminate short of edges of the screen panel to form uncorrugated margins on the screen panel on which the frame is molded. The frame is molded on the margins of the screen panel with an appropriate plastic material, and the corrugations permit the screen panel to accommodate the stresses.

The above and other objects and features of the invention will be apparent to those skilled in the art to which this invention pertains from the following detailed description and the drawings, in which:

FIG. 1 is a perspective view of a molded closure which includes a screen panel with a frame molded thereon in accordance with an embodiment of this invention;

FIG. 2 is a top plan view of the closure illustrated in FIG. 1;

FIG. 3 is a view in section taken on the line 3—3 in FIG. 2;

FIG. 4 is a view in section taken on the line 4—4 in FIG. 2;

FIG. 5 is a view in upright section showing an air duct with the closure of FIG. 1 mounted on an open end thereof;

FIG. 6 is a fragmentary plan view of a screen panel of the closure before molding of the frame thereon;

FIG. 7 is a view in section on an enlarged scale on the line 7—7 in FIG. 6, a fragmentary portion of the frame being shown in dashed lines in association with the screen panel;

FIG. 8 is a view in upright section of molding dies used in molding the closure; and FIG. 9 is a view in section taken on the line 9—9 in FIG. 3.

In the following detailed description and the drawings, like reference characters indicate like parts.

In FIG. 1 is shown a closure structure 15 which includes a molded body 16 including an outer wall plate portion 17 (FIGS. 2 and 3), side plate portions 18 and 19 (FIG. 9), and a cross strip 21. Inwardly directed flanges 22, 23, 24 and 26 on the plate portions 17, 18 and 19 and on the cross strip 21, respectively, define an opening 27 which is closed by a screen cloth panel 29. The flanges 22, 23, 24 and 26 form a frame molded on edges of the screen panel 29. An angle-shaped mounting portion 31 of the closure is hinged to the body 16 by a strip 32 (FIG. 4) of the material which is sufficiently thin to form a hinge. The body 16 and the strip 32 can be formed of polypropylene or the like which can form such a hinge. The screen panel can be formed of parallel metal strands or wires 33 (FIG. 7) interwoven crisscross fashion with strands of wires 34 and defining a plurality of small rectangles as in conventional wire cloth used in screens. The wires 33 and 34 can be of copper, aluminum, galvanized wire, or other metal. The screen cloth is originally flat, but, before the molding of the frame thereon, the panel is provided with a plurality of transverse side-by-side corrugations 36 which can be parallel to the strands 33. As shown in FIG. 6, the corrugations 36 terminate short of edges of the panel so that marginal edges 37, 38 and 39, and a fourth edge, not shown, on which the frame is molded are uncorrugated. The depth of the corrugations is sufficient to provide screen material which can accommodate molding stresses. In standard screen wire, the degree of deforming of the wire at peaks of the corrugations from the plane of the screen cloth can be about one-sixteenth inch, or can be greater so long as the deformation is within the capability of stretching of the screen cloth without failure.

The closure can be molded between molding dies 42 and 43 as shown in FIG. 8. Cavities 44 and 46 in the molding dies are of appropriate shape to form the closure. The dies substantially meet at side lines 47 and 48 where the screen panel 29 is held thereby at marginal edges of the screen panel 29 and at end lines (not shown) to define a cavity 49 between the die members in which the corrugated portion of the screen panel 29 is received during molding. Plastic is introduced into the mold cavities through appropriate gates 51 and 52. The plastic enters the mold at a high temperature and under high pressure, and the changing temperatures as the plastic and the screen panel 29 cool set up stresses in the plastic and in the screen panel. In addition, as the plastic flows into the mold cavities, the movement thereof under pressure along the edges of the screen panel can also set up stresses. The corrugations permit relief of these stresses without extending the stresses along the panel 29.

The body of the closure described above can be formed of polypropylene plastic material. However, the corrugated screen panels of this invention can be used with frames formed of other appropriate commercially available plastic which satisfactorily adheres to the metal of the screen panel.

The closure can be mounted at an end of a tubular duct 56 (FIG. 5). A perforated flange 57 of the angle-shaped frame mounting portion 31 can be mounted flatwise against a flange 58 on the duct 56 with fasteners 59 which extend through perforations 61 (FIG. 2) of the flange 57 and aligned perforations (not shown) in the flange 58 (FIG. 5) holding the closure with the body 16 arranged to swing between the full line position of FIG. 5 at which air or the like can pass through the screen panel 29 ino the duct 56 and a closed position shown in dashed lines. An opening 63 (FIG. 2) is provided in the panel 17 for mounting an appropriate handle or the like (not shown) for operating the closure.

The framed screen construction illustrated in the drawings and described above is subject to structural modification without departing from the spirit and scope of the appended claims:

Having described our invention, what we claim as new and desire to secure by Letters Patent is:

1. In combination, a screen panel of criss-cross interwoven metal screen wires, there being a plurality of side-by-side corrugations in a central portion of the screen panel, and a plastic frame molded on marginal edges of the screen panel, the corrguations extending substantially normally to and terminating adjacent lengthwise marginal edges of the screen panel.

2. A combination as in claim 1 wherein the plastic is polypropylene.

References Cited
UNITED STATES PATENTS

| | | | |
|---|---|---|---|
| 2,316,526 | 4/1943 | McDonald | 160—382 X |
| 2,494,844 | 1/1950 | Tondora | 160—92 X |
| 3,009,169 | 11/1961 | Bodner. | |
| 3,048,897 | 8/1962 | Slade. | |
| 3,107,991 | 10/1963 | Taussig. | |

DAVID J. WILLIAMOWSKY, Primary Examiner

P. C. KANNAN, Assistant Examiner

U.S. Cl. X.R.

264—273